(12) United States Patent
Lewis et al.

(10) Patent No.: US 7,395,309 B1
(45) Date of Patent: Jul. 1, 2008

(54) MODEM ACTIVITY DETECTION

(75) Inventors: Gary M. Lewis, Derry, NH (US); De Fu Li, Wayland, MA (US); Nathan R. Melhorn, Chelmsford, MA (US)

(73) Assignee: Cisco Technology, Inc., San Jose, CA (US)

( * ) Notice: Subject to any disclaimer, the term of this patent is extended or adjusted under 35 U.S.C. 154(b) by 620 days.

(21) Appl. No.: 09/894,261

(22) Filed: Jun. 28, 2001

Related U.S. Application Data

(60) Provisional application No. 60/220,595, filed on Jul. 25, 2000.

(51) Int. Cl.
*G06F 15/16* (2006.01)
(52) U.S. Cl. .................. 709/200; 370/352; 370/462; 370/208; 370/401; 375/220; 375/222; 379/188; 379/219
(58) Field of Classification Search ................ 709/246, 709/227, 250; 370/493, 400, 401, 356, 465, 370/236, 316, 462, 352, 362, 208; 375/222; 455/560; 379/207.06, 207.07, 207.08
See application file for complete search history.

(56) References Cited

U.S. PATENT DOCUMENTS

| | | | | |
|---|---|---|---|---|
| 4,567,595 | A | * | 1/1986 | Hedlund .................. 714/800 |
| 4,646,287 | A | * | 2/1987 | Larson et al. ............. 370/400 |
| 5,343,473 | A | * | 8/1994 | Cidon et al. .............. 370/465 |
| 5,682,417 | A | * | 10/1997 | Nitta ....................... 455/560 |
| 5,721,726 | A | * | 2/1998 | Kurnick et al. ............ 370/236 |
| 5,959,996 | A | * | 9/1999 | Byers ....................... 370/401 |
| 6,295,314 | B1 | * | 9/2001 | Cole ........................ 375/222 |
| 6,445,731 | B1 | * | 9/2002 | Yamano et al. ............ 375/222 |
| 6,535,521 | B1 | * | 3/2003 | Barghouti et al. .......... 370/462 |
| 6,757,250 | B1 | | 6/2004 | Fayad et al. |
| 6,765,931 | B1 | * | 7/2004 | Rabenko et al. ............ 370/493 |
| 6,788,651 | B1 | | 9/2004 | Brent et al. |
| 6,798,786 | B1 | | 9/2004 | Lo et al. |
| 6,829,244 | B1 | | 12/2004 | Wildfeuer et al. |
| 6,865,220 | B2 | * | 3/2005 | Abrishami ................. 375/220 |
| 6,870,837 | B2 | * | 3/2005 | Ho et al. .................. 370/356 |
| 6,934,280 | B1 | * | 8/2005 | Ho et al. .................. 370/352 |
| 7,095,708 | B1 | * | 8/2006 | Alamouti et al. ........... 370/208 |
| 7,113,501 | B2 | * | 9/2006 | Garakani et al. ........... 370/352 |
| 2002/0064137 | A1 | | 5/2002 | Garakani et al. |

(Continued)

OTHER PUBLICATIONS

Schulzrinne, H. et al., "RTP: A Transport Protocol for Real-Time Applications," STD 1, RFC 1889, Internet Engineering Task Force (Jan. 1996).

(Continued)

*Primary Examiner*—Dustin Nguyen
(74) *Attorney, Agent, or Firm*—Hamilton, Brook, Smith & Reynolds, P.C.

(57) ABSTRACT

A method for reducing Internet bandwidth used for data transfer between an originating modem and an answering modem over a VoIP connection is provided. Idle data received from the originating modem is detected by an Internet node. The Internet node does not forward the detected received idle data over the VoIP connection. To keep the modem connection between the originating modem and the answering modem alive, the Internet node regenerates idle data and transmits the regenerated idle data to the answering modem upon detecting no data received for forwarding to the answering modem.

15 Claims, 6 Drawing Sheets

U.S. PATENT DOCUMENTS

| | | | |
|---|---|---|---|
| 2002/0164002 A1 | 11/2002 | Beadle et al. | |
| 2003/0012152 A1* | 1/2003 | Feldman et al. | 370/316 |
| 2003/0123466 A1* | 7/2003 | Somekh et al. | 370/401 |
| 2003/0133461 A1* | 7/2003 | Ho et al. | 370/395.52 |
| 2003/0210677 A1 | 11/2003 | Grove et al. | |
| 2004/0022241 A1 | 2/2004 | Boynton et al. | |
| 2004/0218739 A1 | 11/2004 | Nicol | |

OTHER PUBLICATIONS

ITU-T Recommendation T.38, "Procedures for real-time Group 3 facsimile communication over IP networks", International Telecommunication Union, (Jun. 1998).

ITU-T Recommendation T.38 Amendment 1, "Procedures for real-time Group 3 facsimile communication over IP networks", International Telecommunication Union, (Apr. 1999).

"Revised Annex B of Recommendation T.38", International Telecommunication Union, (Nov. 1998).

ITU-T Recommendation H.323, "Packet-based multimedia communications systems", International Telecommunication Union, (Feb. 1998).

ITU-T Recommendation H.323—Annex D, "Packet-based multimedia communications systems; Annex D: Real-time facsimile over H.323 systems", International Telecommunication Union, (Sep. 1998).

* cited by examiner

MODEM ACTIVITY DETECTION

RELATED APPLICATION

This application claims the benefit of U.S. Provisional Application No. 60/220,595, filed on Jul. 25, 2000. The entire teachings of the above application are incorporated herein by reference.

This application is related to U.S. patent application entitled "Modem Relay Application over VoIP Network," by Lewis et. al., U.S. patent application Ser. No. 09/894,725, filed on Jun. 28, 2001, now abandoned, the entire teachings of which are incorporated herein by reference.

BACKGROUND OF THE INVENTION

A modem translates digital data originating in a digital device, such as a computer, to an analog signal so that it can be transmitted on an analog telephone line to another digital device. The modem also translates the incoming analog signal originating in the other digital device to digital data for the digital device. Thus, the analog telephone line can be used to transmit data between digital devices.

In order for a modem to transmit data to another modem, the calling (originating) modem dials the telephone phone number of the answering (terminating) modem. The General Switched Telephone Network ("GSTN") (the Public Switched Telephone Network, ("PSTN"), is an instance of a GSTN) rings the answering modem indicating an incoming call. The answering modem goes off-hook to accept the call. A GSTN switched connection now exists between the calling modem and the answering modem. The modems go through a series of training steps, to adjust to each other's characteristics, and to the characteristics of the switched connection. These training steps can include Answer Back Tone ("ABT") and other modem detect signals, V.8, V.8bis, auto-mode, and the negotiation of error correction and data compression. These steps are defined by the International Telecommunications Union ("ITU") V series of modem recommendations and other modem specifications including Flex and MNP5 compression. ITU V series modem recommendations include, for example, V.8, V.8bis, V.42, V.42bis, V.21, V.22bis, V.32, V.32bis, V.34, V.90 and V.92.

Real-time audio, such as a telephone conversation originating on an analog telephone line, may be transmitted over a packet network such as, the Internet using Voice over Internet Protocol ("VoIP"). VoIP may be used instead of a GSTN switched connection in order to avoid incurring charges for a long distance telephone call. One standard VoIP protocol for encapsulating real-time audio data is the Real-Time Transport Protocol ("RTP") (Request for Comments ("RFC") 1889, January 1996) available on the Internet Engineering Task Force ("IETF") web site.

To transmit voice data over the Internet, a packet transmitter in the source Internet node encodes the analog voice signal, stores the encoded data in the payload of one or more data packets, and transmits the data packet over the Internet. Each data packet includes a destination address in a header included in the data packet.

Modem and Voice transport services are inherently part of a traditional GSTN network. Thus, a VoIP gateway must support both modem and voice. One known method for supporting modem service over VoIP transport is called modem pass-through. Modem pass-through emulates a GSTN network when transporting a G.711 Pulse Code Modulation ("PCM") stream. To implement modem pass-through, VoIP sets its encoder/decoder (CODEC) to PCM, disables the echo canceler and fine tunes the voice play out for handling de-jitter of arriving RTP data packets.

Voice activity detection ("VAD") is a method used by VoIP to detect the start of a period in which audio received from the GSTN network does not contain spoken words. The period in which the audio does not contain spoken words is sometimes called "a period of silence". Upon detecting a period of silence, the transmitter gateway stops transmitting data packets onto the VoIP network. During the period of silence, the remote gateway generates comfort noise and transmits the comfort noise to the GSTN network. However, when transmitting data between modems, there is no "period of silence" while the connection is idle, because of the requirement to keep the connection between the modems alive. Thus, using VoIP to transfer data between modems consumes Internet bandwidth by transferring unnecessary idle data packets over the Internet while the connection is idle.

SUMMARY OF THE INVENTION

The present invention provides a method for reducing Internet bandwidth for a VoIP modem relay by not transmitting idle data packets between Internet nodes. The method is implemented in an Internet node.

A first modem is coupled to the Internet node and a second modem is coupled to another Internet node. Upon detecting no data received from the other Internet node to transmit to the first modem, the Internet node regenerates idle data to transmit to the first modem. Upon detecting idle data received from the first modem to forward to the other Internet node, the Internet node drops the detected idle data.

The idle data may be 'FF' or '7E'. The Internet node may be an Internet Gateway.

An Internet node includes an idle detect module and an idle generate module. The idle detect module detects idle data received from a first modem coupled to the Internet node and drops the detected idle data. The idle generate module regenerates idle data to transmit to the first modem upon detecting no data received from a second modem coupled to another Internet node.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
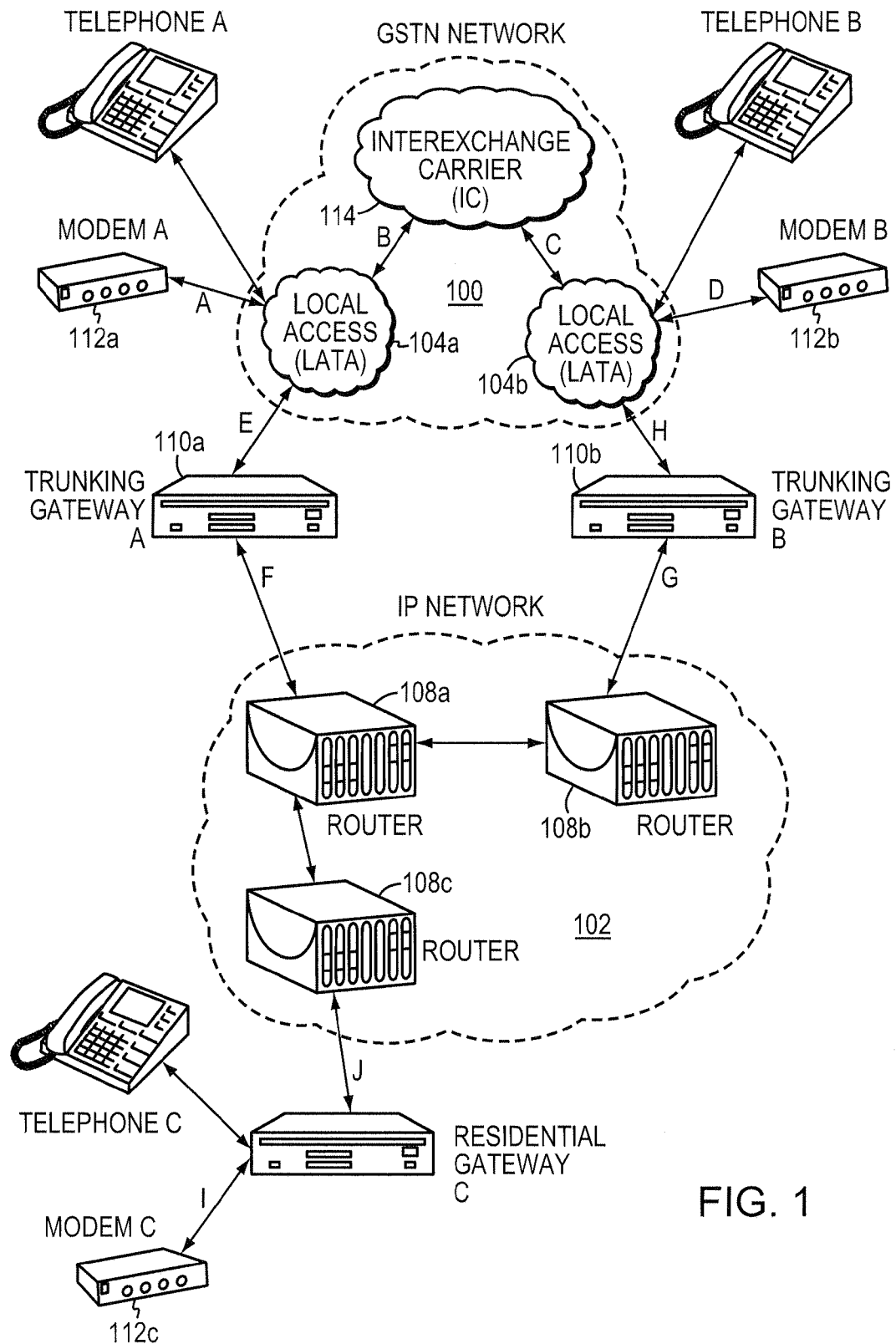
FIG. 1 illustrates a General Switched-Telephone Network ("GSTN"), an IP Network, and VoIP Gateways that interconnect the GSTN and the IP Network for providing reliable modem connection over a VoIP Network according to the principles of the present invention.

FIG. 1 illustrates a General Switched-Telephone Network ("GSTN") 100, an IP Network 102, and VoIP Gateways 110a, 110b that interconnect the GSTN 100 and the IP Network 102 for providing reliable modem connection over a VoIP Network according to the principles of the present invention. The GSTN 100 includes multiple Local Access and Local Transports ("LATAs") 104a, 104b. Local Exchange Carriers, such as, regional Bell operating companies, and Inter-exchange Carriers ("IC") are LATAs 104a, 104b. A modem connection between modem 112a and modem 112b over the GSTN 100 is illustrated by link A from modem 112a to LATA 104a, link B from LATA 104a to IC 114, link C from IC 114 to LATA 104b and link D from LATA 104b to modem 112b.

With the convergence of voice and data over an IP Network 102, a user can initiate and terminate modem or telephone services at any access point on the GSTN 100 or the IP Network 102 such as, at modem 112a, modem 112b, or modem 112c as shown. A VoIP gateway 110a, 110b can be a residential or a trunking gateway. A VoIP Gateway 110a, 110b allows the user to bypass the IC 114 to avoid incurring charges for a long distance telephony call. The links, AEFGHD, IJFEA, and IJGHD, are examples of connection paths that utilize the IP Network 102 and bypass the IC 114.

Figure 2:
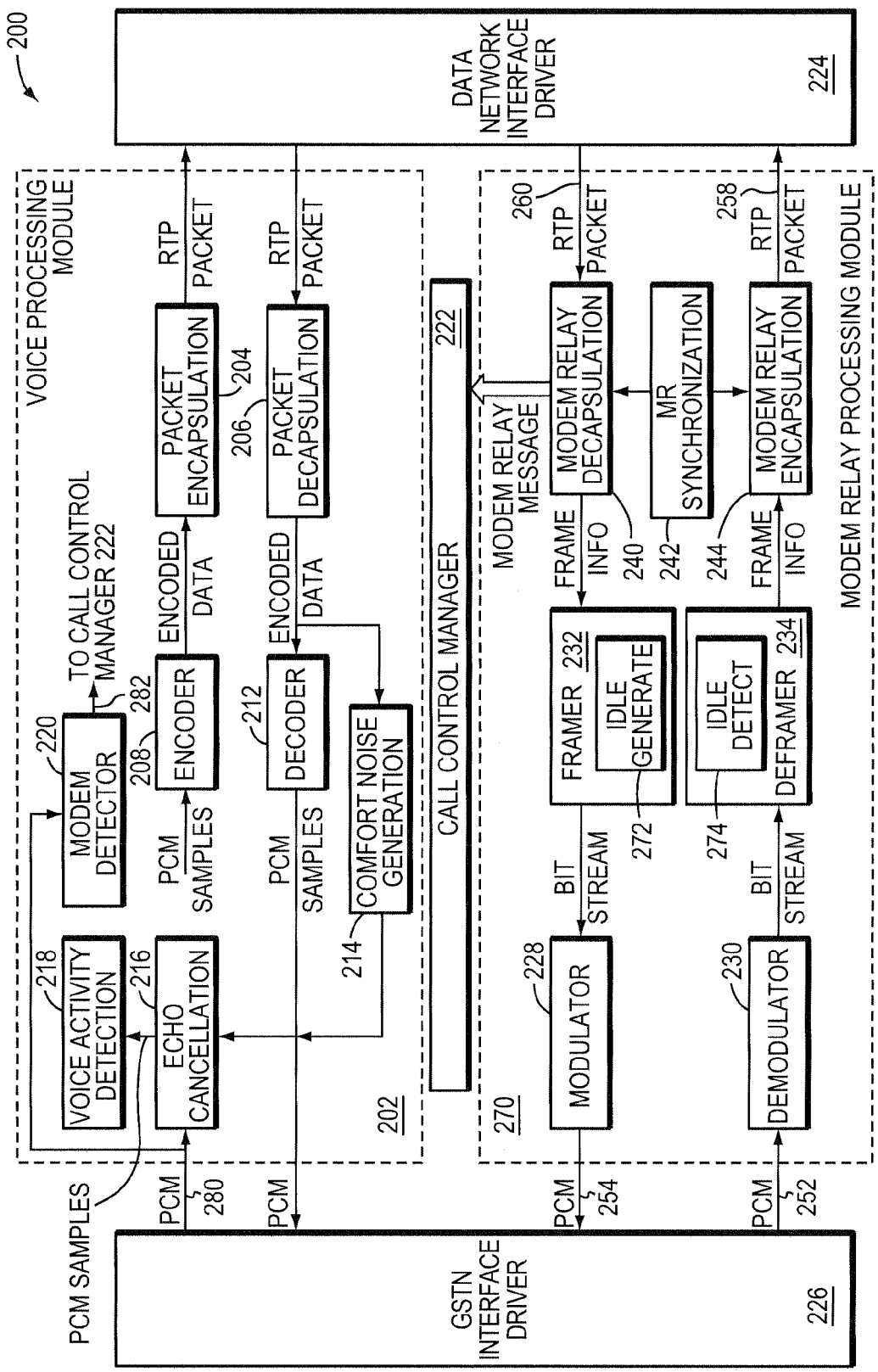
FIG. 2 is a block diagram illustrating the components of the voice gateway implemented in any of the gateways shown in FIG. 1 for implementing framing-mode modem relay.

FIG. 2 is a block diagram illustrating the components of the voice gateway 200 implemented in any of the gateways 110a, 110b shown in FIG. 1 for implementing framing-mode modem relay. The voice gateway 200 includes a call control manager 222, a data network interface driver 224, a General Switched Telephone Network ("GSTN") interface driver 226, a voice processing module 202 and a modem relay processing module 270 for implementing a framing mode modem relay.

The modem relay processing module 270 includes a modulator module 228, demodulator module 230, a framer module 232, a deframer module 234, a modem relay decapsulation module 240, a modem relay flow control module or synchronization module 242 and a modem relay encapsulation module 244. The modulator module 228 and demodulator module 230 implement the transmission layer function of a modem. The modulator module 228 and demodulator module 230 perform modem training and data transmission according to the International Telecommunications Union ("ITU") V.PCM, V.34, V.32, V.22, or V.21 specifications. The framer module 232, and deframer module 234 perform the modem link layer function which is defined by ITU V.42 and Microcom Networking Protocol ("MNP") specifications.

Flow control is required because each end of a modem connection AE (FIG. 1) or DH (FIG. 1) can negotiate and connect at a different rate. The flow control mechanism compensates for the rate difference by using buffering to store a received user data in a buffer (not shown) and a flow control bit in a modem packet header to indicate whether flow control is "on" or "off". The modem packet header is described later in conjunction with FIG. 3. Client modems 112a, 112b, 112c (FIG. 1) connect to the respective side of gateways 110a and 110b (FIG. 1) and fully utilize all modem functions such as, modulation, demodulation, framing and deframing.

The method implemented in a client modem 112a, 112b, 112c (FIG. 1) for connecting to a gateway 110a, 110b, 110c (FIG. 1) is described later in conjunction with FIG. 4. The respective side of the gateway 110a, 110b, 110c (FIG. 1) to which the client modem 112a, 112b, 112c (FIG. 1) connects is dependent on whether the client modem 112a, 112b, 112c (FIG. 1) is an originating modem or an answering modem. Each end of a modem connection performs its own modulation and protocol negotiations. For example, for modem connection AEFGHD (FIG. 1), one end of the modem connection is AE (FIG. 1) and the other end of the modem connection is DH (FIG. 1). Each modem pair (gateway 110a (FIG. 1), modem 112a (FIG. 1)), may retrain and speed-shift depending on the quality of the GSTN line characteristics independently of the other modem pair (gateway 110b (FIG. 1), modem 112b (FIG. 1)) in the modem connection AEFGHD (FIG. 1). The characteristics create mismatched transmitted and received data rates between each end of the modem connection (AE (FIG. 1); DH (FIG. 1)).

A modem packet header is encapsulated as RTP payload. A modem packet header includes flow control bits, to maintain modem connection. Flow control compensates for the rate difference between the gateways 110a, 110b, 110c (FIG. 1). User data is encapsulated into RTP Packets and exchanged across the IP network 102 (FIG. 1). The Real-Time Protocol ("RTP") and modem relay headers are removed from received RTP packets at the Gateway 110a (FIG. 1), 110b (FIG. 1) and the user data is sent to the modem relay processing module 270 for transmitting to the client modem 112a, 112b (FIG. 1).

Modem relay solves the problem of network timing recovery and unreliable delivery of packets over an IP network by performing modulation and demodulation at a VoIP gateway 110a, 110b (FIG. 1) where digital modem data is relayed between the gateways 110a, 110b (FIG. 1) over the IP network 102 (FIG. 1). The framing-mode modem relay does not implement full modem functionality and thus requires close synchronization and timing of modem connection procedures.

The modem relay processing module 270 encapsulates an incoming Pulse Code Modulated ("PCM") stream 252 in an RTP packet. The Demodulator module 230 receives a PCM stream from the GSTN Interface Driver 226 and performs demodulation of the PCM stream according to the ITU V Series of modem specifications to provide a bit stream. The Deframer module 234 performs deframing of the bit stream according to V.42 or MNP specifications. The modem relay encapsulation module 244 performs encapsulation of data into a modem relay packet, by storing the data in the modem relay payload and control information in the modem relay header and further encapsulates the modem relay packet into an RTP packet. The Modem Relay flow control module 242 looks at the RTP packet buffer memory (not shown). Once the RTP packet buffer memory reaches a certain water mark level, the modem relay flow control module 242 signals the Modem Relay encapsulation module 244 to set flow off bits. The flow off bits are in the modem relay flow control module 242. The modem relay flow control module 242 sets the flow control information bit in the modem relay header to 'off' in the RTP packet as an indication to the remote gateway 110a, 110b (FIG. 1). The remote gateway 110a, 110b (FIG. 1) stops sending data packets. However, even if the remote gateway 110a, 110b (FIG. 1) continues to send data packets, the local gateway 110a, 110b (FIG. 1) discards all received data. Data is received again only after the local gateway 110a, 110b (FIG. 1) turns flow control 'off'.

The modem relay processing module 270 converts user data encapsulated in an RTP packet received from the data network interface driver 234 to outgoing PCM data 252 which is forwarded to the GSTN interface driver 226. The Modem Relay Decapsulation module 240 processes an incoming RTP packet 260 and performs Decapsulation of a modem relay packet by extracting the data stored in the payload of the incoming RTP packet 260. The Framer module 232 performs framing of the frame information received from the error correction module according to V.42 or MP specifications. The Modulator 228 takes the bit stream received from the framer module 232 and performs modulation according to ITU V Series of modem specifications.

The framing-data is relayed without error correction, or data compression processing. Framing-data is encapsulated into an RTP packet as payload of an RTP packet, and relayed among the gateways 110a, 110b (FIG. 1). Error correction and compression are performed at each client modem 112a, 112b, 112c (FIG. 1), where VoIP gateways 110a, 110b (FIG. 1) essentially provide a tunnel for transporting framing-data. There is no need for flow control for the gateways 110a, 110b (FIG. 1). However, end-to-end modem link negotiation synchronization is performed which will be described later in conjunction with FIG. 4. Framing-mode modem relay allows client modems 112a, 112b, 112c (FIG. 1) and gateways 110a, 110b (FIG. 1) to connect at different speeds, and use the same link-layer protocol and compression.

The Call Control Manager 222 manages a VoIP call session. The call control manager 222 uses standard VoIP protocols such as H.323, xGCP and SIP to control the VoIP call session. The Call Control Manager 222 can signal and receive signals from the Voice Processing Module 202 and Modem Relay Processing module 270 using software message queues.

The deframer module 234 includes an idle detect module 274. The framer module 232 includes an idle generate module 272. The idle detect module 274 detects idle data in the PCM stream. Idle data can be 'FF' or '7E' dependent on the negotiated error correction protocol. The idle data received by the deframer 234 is not forwarded over the VoIP connection. Instead, the deframer 234 drops the idle data.

The framer 232 detects an idle period when no RTP packets are being received. In order to maintain the modem connection (keep the modem connection alive), the idle generate module 272 in the framer 232 generates 'idle flags' to be transmitted over the PCM connection.

Figure 3:
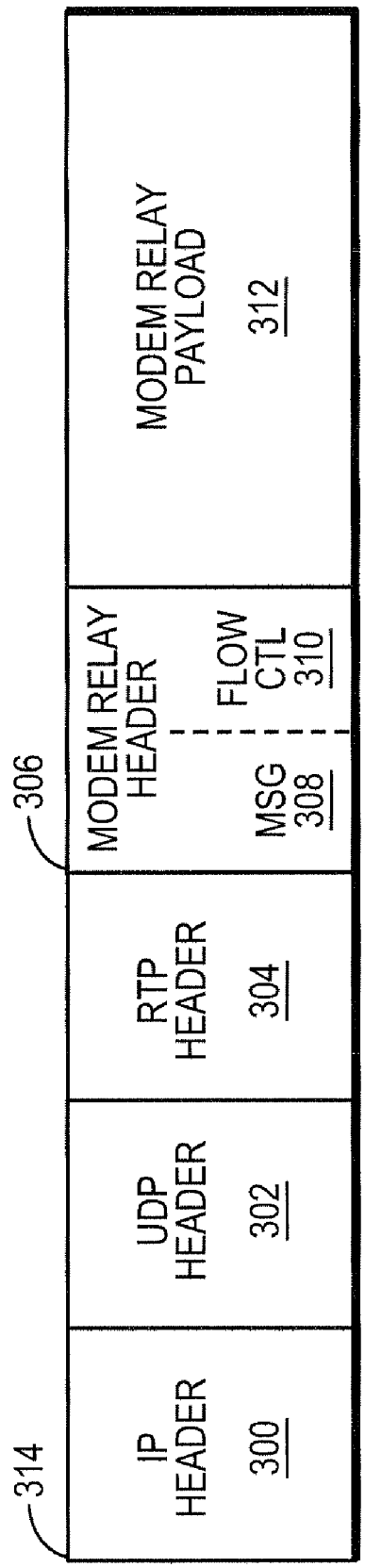
FIG. 3 illustrates an IP packet that encapsulates an RTP packet as its payload.

FIG. 3 illustrates an IP packet 314 that encapsulates an RTP packet as its payload. The RTP standard protocol is described in rfc1889.txt and available on the Internet Engineering Task Force ("IETF") web site. A modem relay packet is added as RTP payload 312. The modem relay packet includes a modem relay header 306 and a modem relay payload 312. The modem relay header 306 provides control message identification 308 and flow control information 310.

In one embodiment, the modem relay header 306 is 8 bits and includes a control message identification bit 308 and a flow control information bit 310. The modem relay data payload 312 is framed-data or user-data depending on the method of modem relay. The state of the message bit 308 indicates whether the modem relay data payload 312 includes modem relay messages. The state of the flow control bit 310 indicates whether flow control is "on" or "off". For example, if the message bit 308 is '1', and the flow control bit 310 is '1', the modem relay data payload 312 includes a modem relay message and flow control is "off".

Figure 4:
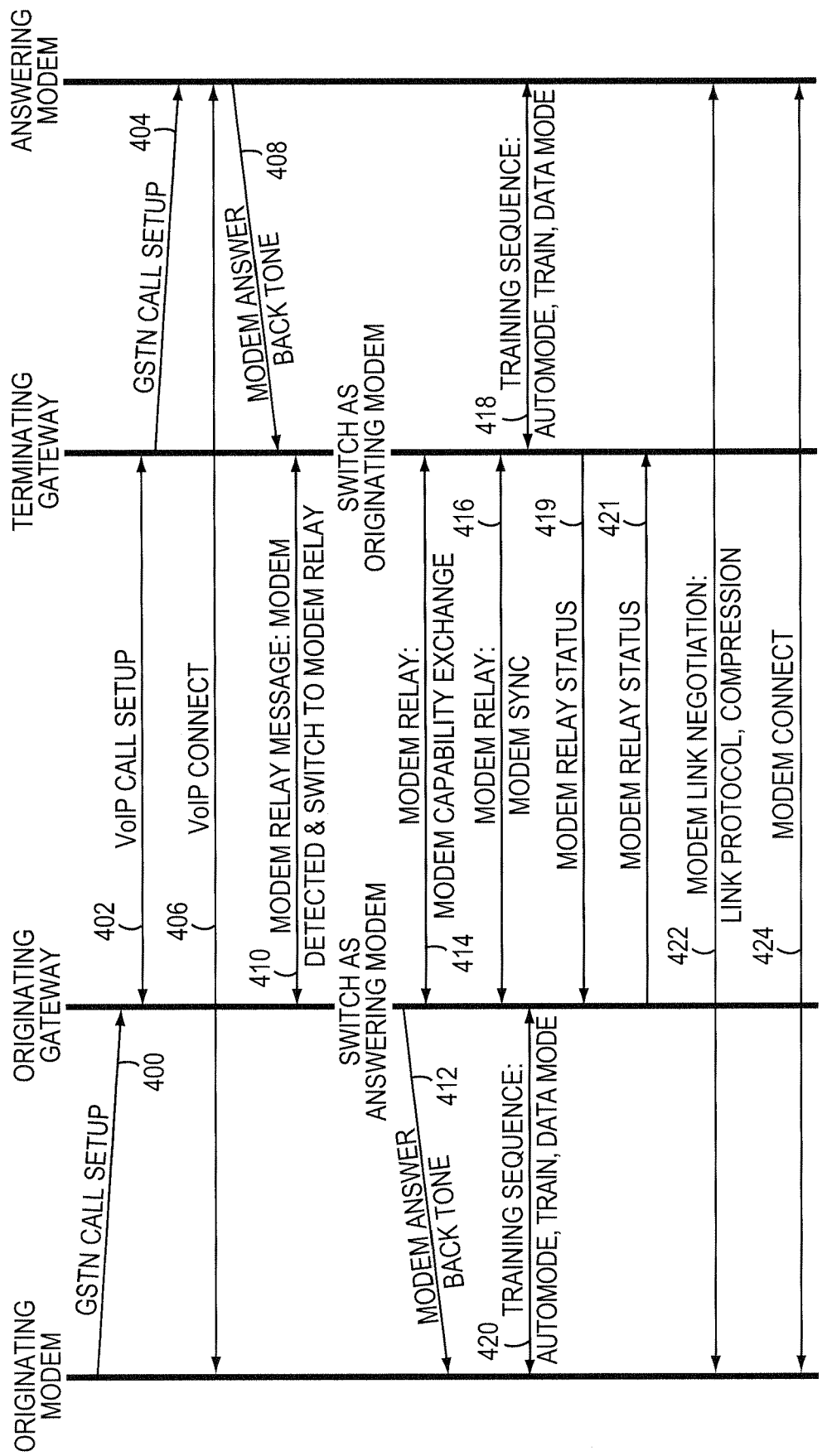
FIG. 4 illustrates the Framing Mode Modem Relay Call Flow implemented in the voice gateway shown in FIG. 2.

FIG. 4 illustrates the Framing Mode Modem Relay Call Flow implemented in the voice gateway 200 shown in FIG. 2. FIG. 4 is described in conjunction with FIG. 1 and FIG. 2. Modem answer back tone, training sequence, and link negotiating procedures are well-known and defined in ITU V Series Standards. The modem relay procedures to embody modem connection procedures in the context of VoIP call flow are illustrated. The call flow for framing-mode modem relay as shown in FIG. 4 is described below.

At step 400, the Originating Modem 112a (FIG. 1) initiates a call. The call is initiated using the well-known method of GSTN call-setup to the Originating Gateway 110a (FIG. 1). Call-setup is a generic terminology for describing well-known call setup procedures that are employed for a GSTN 100 (FIG. 1) or a VoIP network. Modem answer back tone (ITU V.25), training sequence (ITU V.90, V.34 or V.32), and link negotiating procedures (ITU V.42 and MNP) which are incorporated herein by reference in their entirety, are well-known by those skilled in the art and defined in ITU V series standards.

At step 402, the Originating Gateway 110a (FIG. 1) establishes a VoIP session with the Terminating Gateway 110b (FIG. 1) using protocols described in the International Telecommunications Union ("ITU") H.323 specifications or the IETF Media Gateway Control Protocols ("MGCP") incorporated herein by reference in their entirety. Methods for establishing a VoIP session with the Terminating Gateway 110b (FIG. 1) are well-known and include H.232, XGCP, SIP or any other VoIP protocol incorporated herein by reference in their entirety.

At step 404, the Terminating Gateway 110b (FIG. 1) calls the Answering Modem 112b (FIG. 1). The Answering Modem 112b (FIG. 1) answers the call and at step 406, an end-to-end VoIP connection between the originating modem 112a (FIG. 1) and the terminating modem 112b (FIG. 1) is established using methods well-known in the art.

At step 408, the Answering Modem 112b (FIG. 1) starts a modem training sequence by sending modem answer back tone on PCM data 270 (FIG. 2).

At step 410, the modem detector module 220 (FIG. 2) in the Terminating Gateway 110b (FIG. 1) detects Answer Back Tone ("ABT") and signals the call control manager 222 (FIG. 2) through modem detect signal 272 (FIG. 2) that it has detected ABT. The call control manager 222 (FIG. 2) in the Terminating Gateway 110b (FIG. 1) signals the originating gateway 110a (FIG. 1) by signaling the modem relay decapsulation module 240 (FIG. 2) through signal 256 (FIG. 2). Upon detecting signal 256, the modem relay decapsulation module 240 in the terminating gateway 110b (FIG. 1) sends a modem relay message to the originating gateway 110a (FIG. 1). The modem relay message sent is a modem detect message. The modem detect message includes an indication that modem answer back tone has been detected by the Terminating Gateway 110b (FIG. 1). The modem relay detect message signals the originating gateway 110a (FIG. 1) to start a modem relay session. The modem relay payload included in the modem relay detect message contains the type of modem relay to perform (framing mode). Further modem relay messages are exchanged between the gateways 110a, 110b (FIG. 1) including a switch to modem relay message.

At step 412, the call control manager 222 (FIG. 2) in the originating gateway 110a (FIG. 1) receives the modem relay message indicating modem call, switches from the voice processing module 202 (FIG. 2) to the modem relay processing module 250 (FIG. 2) and starts a modem training sequence as the answering modem 112b (FIG. 1) with the originating modem 112a (FIG. 1).

At step 414, the terminating gateway 110b (FIG. 1) and originating gateway 110a (FIG. 1) exchange a modem capability exchange message. The capability exchange message is stored in the modem relay payload 412 (FIG. 3).

The Gateways 110a, 110b (FIG. 1) exchange link information. The gateways 110a, 110b (FIG. 2) are synchronized by using the modem relay capabilities exchange message to set up the type of modem connection. The modem relay capability exchange message exchanges the modem capabilities such as error correction protocol and modulation (V90, V34 . . . ). The modem relay payload contains error correction protocol type and modulation type.

At step 416, the terminating gateway 110b and originating gateway 110a (FIG. 1) exchange a modem sync message. The modem sync message is stored in the modem relay payload 412 (FIG. 3). The modem relay sync message signals the remote gateway to start modem training. After the modem connection is set up, the modem relay sync message starts the modem training sequence. The originating modem 112a (FIG. 1) starts modem training sequence as answering modem by first sending answer back tone through the modulator module 228 (FIG. 1) and the demodulator module.

At step 418, the modem detector module 270 (FIG. 2) in the terminating gateway 110b (FIG. 1) detects ABT and signals the call control manager 222 (FIG. 2) to start mode training. The Terminating Gateway 110b (FIG. 2) switches to the user-mode modem relay processing module 270, and starts modem training sequence as the originating modem 112a (FIG. 1).

At step 419 and 421, at successful completion of modem training, a Modem Relay Status message is sent to remote gateway. The modem relay status message contains modem relay status such as connection rate, retrain or speed shift. The modem relay status message is used to signal the start of modem relay data transfer. The modem relay payload 412 FIG. 2 stores the above information.

At step 422, once both sides have received a Modem Relay Status, the modem is in connect state and Framing-data is encapsulated as modem relay packet in an RTP payload.

At step 420, the call control manager 222 (FIG. 2) in the Originating modem 112a (FIG. 1) switches processing of RTP packets and PCM data from the voice processing module 202 (FIG. 1) to the user-mode modem relay processing module 270 (FIG. 2) by disabling voice processing and enabling modem relay processing. The Originating modem 112a (FIG. 1) starts modem training sequence as answering modem by first sending answer back tone through the modulator module 228 (FIG. 2) and the demodulator module 230 (FIG. 2).

Client modems now start link negotiation for error correction protocol and compression parameters. Link negotiation is defined in the V.42 and MNP standards.

At step 424, after the link negotiation is complete, end to end framing-modem connection is established. Once both sides have completed training, modem modulation modules (modulator and demodulator) can transmit data.

Figure 5:
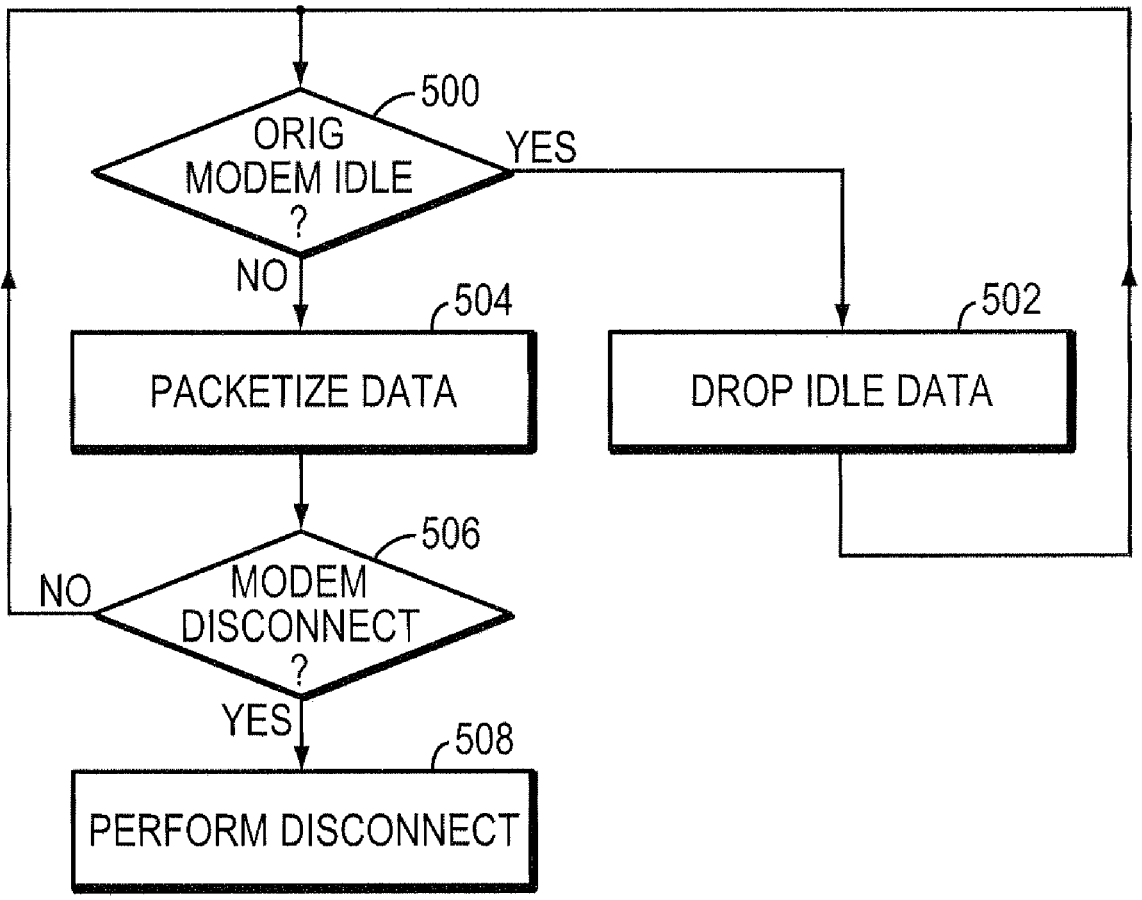
FIG. 5 illustrates the steps implemented in one of the Internet nodes for detecting idle data received by an Internet node from an originator modem.

FIG. 5 illustrates the steps implemented in one of the Internet nodes for detecting idle data received by an Internet node from an originating modem.

At step 500, the idle detect module 274 (FIG. 2) in the deframer module 234 (FIG. 2) detects 'idle flags' received in the PCM data 252 from the originating modem 112a (FIG. 1). The idle flags are transmitted by the originating modem 112a (FIG. 1) to be forwarded to the answering modem 112b (FIG. 1) to keep the modem connection between the originating modem 112a (FIG. 1) and the answering modem 112b (FIG. 1) alive. If idle flags are detected, processing continues with step 502. If not, processing continues with step 504.

At step 502, while idle flags are detected by the idle detect module 274 (FIG. 2), the deframer 234 (FIG. 2) drops the idle flags. The idle flags are not forwarded over the VoIP connection and the deframer 234 forwards no data packets. Processing continues with step 506.

At step 504, idle flags are not received. The deframer 234 (FIG. 2) stores the received PCM data 252 (FIG. 2) in the modem relay payload 312 (FIG. 3) of the RTP data packet 314 (FIG. 3) and forwards the data packet 314 (FIG. 3) over the IP network 102 (FIG. 1). Processing continues with step 506.

At step 506, the call control manager 222 (FIG. 2) determines if the originating modem 112a (FIG. 1) has disconnected. A disconnect can be detected by a loss of carrier tone. If so, processing continues with step 508. If not, processing continues with step 500.

At step 508, the call control manager 222 (FIG. 2) processes the detected disconnect. The details of such further processing are conventional and beyond the scope of the invention.

Figure 6:
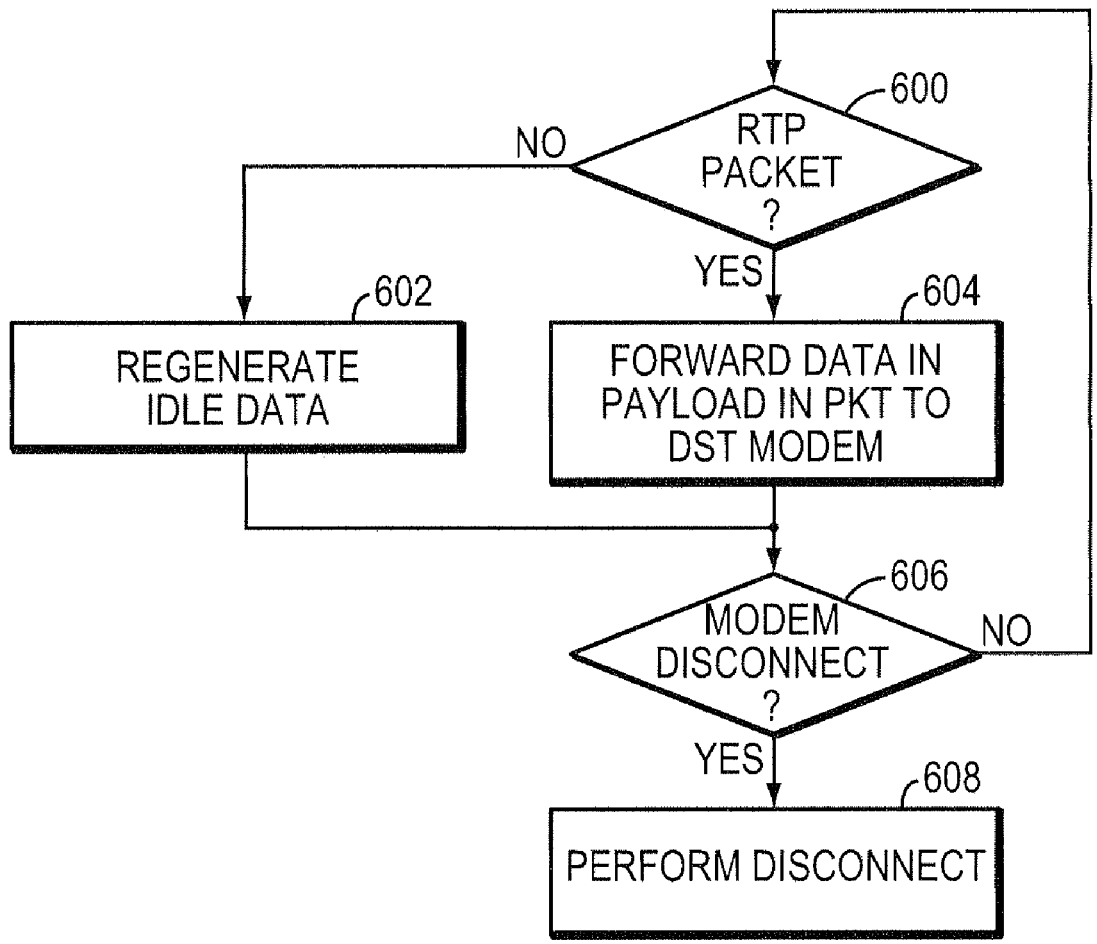
FIG. 6 illustrates the steps implemented in one of the Internet nodes for transmitting "idle flags" to the destination modem upon detecting no modem activity from the originator modem.

FIG. 6 illustrates the steps implemented in one of the Internet nodes for transmitting 'idle flags' to the answering modem 112b (FIG. 1) upon receiving no data packets from the originating modem 112a (FIG. 1).

At step 600, if the framer 232 (FIG. 2) receives an RTP data packet 314 (FIG. 3), processing continues with step 604. If not, processing continues with step 602.

At step 602, the framer 232 (FIG. 2) has detected that the modem connection between the originating modem 112a (FIG. 1) and the answering modem 112b (FIG. 1) is idle. The idle generate module 272 (FIG. 2) in the framer 232 (FIG. 2) regenerates idle data dependent on the negotiated protocol for transmission between gateway 110b (FIG. 1) and answering modem 112b (FIG. 1). The regenerated idle data is transmitted to answering modem 112b (FIG. 1). Processing continues with step 606.

At step 604 the modem connection is not idle, the framer 232 (FIG. 2) receives an RTP data packet 314 (FIG. 3) and extracts the payload 312 (FIG. 3) from the RTP data packet 314 (FIG. 3). The data extracted from the payload 312 (FIG. 3) is forwarded as PCM data 254 (FIG. 2) to answering modem 112b (FIG. 1). Processing continues with step 606.

At step 606, the call control manager 222 (FIG. 2) determines if the modem connection between the originating modem 112a (FIG. 1) and the answering modem 112b (FIG. 2) has disconnected. If so, processing continues with step 608. If there is no disconnect, processing continues with step 600.

At step 608, the call control manager 222 (FIG. 2) processes the detected disconnect. The details of such further processing are conventional and beyond the scope of the invention.

It will be apparent to those of ordinary skill in the art that methods involved in the present invention may be embodied in a computer program product that includes a computer usable medium. For example, such a computer usable medium may consist of a read only memory device, such as a CD ROM disk or conventional ROM devices, or a random access memory, such as a hard drive device or a computer diskette, having a computer readable program code stored thereon.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method implemented in an Internet node for reducing Internet bandwidth used for VoIP modem relay, a first modem coupled to the Internet node and a second modem coupled to an other Internet node, the method comprising:

upon detecting no data packets received at the Internet node from the other Internet node over an IP network to transmit over a switched telephone network to the first modem, regenerating idle data at the Internet node to transmit to the first modem, the regenerated idle data used to maintain a connection between the first modem and the second modem; and upon detecting idle data received from the first modem over a switched telephone network at the Internet node to forward to the other Internet node over the IP network in a payload of a data packet, suspending transmission of data packets to the other Internet node for transmission to the second modem; and resuming transmission of data packets to the other Internet node for transmission to the second modem, upon receiving data from the first modem that is not idle data.

2. The method as claimed in claim 1 wherein the idle data is 'FF'.

3. The method as claimed in claim 1 wherein the idle data is '7E'.

4. The method as claimed in claim 1 wherein the Internet node is an Internet Gateway.

5. An apparatus at an Internet node for reducing Internet bandwidth used for transferring data between a first modem and a second modem over an IP network, the apparatus comprising:

means for detecting idle data received from the first modem over a switched telephone network to forward over the IP network;

means for suspending transmission of data packets to an other Internet node for transmission to the second modem upon detecting idle data received from the first modem;

means for resuming transmission of data packets to the other Internet node for transmission to the second modem, upon receiving data from the first modem that is not idle data; and means for regenerating idle data to transmit to the second modem upon detecting no data packets received over the IP network to forward to the second modem, to maintain a connection between the first modem and the second modem.

6. The apparatus as claimed in claim 5 wherein the idle data is 'FF'.

7. The apparatus as claimed in claim 5 wherein the idle data is '7E'.

8. The apparatus as claimed in claim 5 wherein the Internet node is an Internet gateway.

9. A computer readable storage medium containing instruction readable by computer to configure the computer to perform a method for controlling an Internet node comprising:

an idle detect module which detects idle data received from a first modem coupled to the Internet node over a switched telephone network to be forwarded to a second modem over an IP network in a payload of a data packet, suspends transmission of data packets to an other Internet node for transmission to the second modem upon detecting idle data received from the first modem and resumes transmission of data packets to the other Internet node for transmission to the second modem upon receiving data from the first modem that is not idle data; and an idle generate module which regenerates idle data to transmit to the first modem upon detecting no data packets received from the other Internet node over the IP network from a second modem coupled to the other Internet node to be forwarded to the first modem, the regenerated idle data used to maintain a connection between the first modem and the second modem.

10. The computer readable storage medium as claimed in claim 9 wherein the idle data is 'FF'.

11. The computer readable storage medium as claimed in claim 9 wherein the idle data is '7E'.

12. The computer readable storage medium as claimed in claim 9 wherein the Internet node is an Internet gateway.

13. A computer program product, for reducing Internet bandwidth used for transferring data between a first modem and a second modem over an IP network, the first modem coupled to a first Internet node, the second modem coupled to a second Internet node, the first Internet node and the second Internet node coupled to the IP network, the computer program product comprising a computer usable medium having computer readable program code thereon, including program code which:

regenerates idle data in the first Internet node to transmit to the first modem, upon detecting no data packets received from the second Internet node over the IP network to forward to the first modem; and detects idle data received from the first modem over a switched telephone network at the first Internet node to forward to the second Internet node over the IP network in a payload of a data packet, the regenerated idle data used to maintain the connection between the first modem and the second modem;

suspends transmission of data packets to the second Internet node for transmission to the second modem upon detecting idle data received from the first modem; and resumes transmission of data packets to the second Internet node for transmission to the second modem upon receiving data from the first modem that is not idle data.

14. The method of claim 1, wherein the idle data transmitted over the switched telephone network is encoded in a PCM stream.

15. The method of claim 1 further comprising:

establishing a modem connection between the first modem and the second modem.

* * * * *